United States Statutory Invention Registration [19]

[11] Reg. Number: H323

Graham et al. [43] Published: Sep. 1, 1987

[54] ELECTROMECHANICAL LAG ANGLE DETECTOR

[75] Inventors: Gregory S. Graham, Sylvania; Harold V. White, Huntsville, both of Ala.

[73] Assignee: The United States of America as represented by the Secretary of the Army, Washington, D.C.

[21] Appl. No.: 861,197

[22] Filed: May 8, 1986

[51] Int. Cl.[4] ..... B65H 54/28
[52] U.S. Cl. ..... 242/158 R
[58] Field of Search ..... 242/158 R, 158.2, 158.4 R, 242/25 R

[56] References Cited

U.S. PATENT DOCUMENTS

| | | | |
|---|---|---|---|
| 3,031,153 | 4/1962 | Attwood et al. | 242/158 R |
| 3,039,707 | 6/1962 | Beck et al. | 242/158.2 X |
| 3,544,035 | 12/1970 | Woolever | 242/158 R |
| 3,833,184 | 9/1974 | Hara et al. | 242/158 R |
| 4,022,391 | 5/1977 | Stein et al. | 242/158 R X |
| 4,373,686 | 2/1983 | Milli | 242/158.2 |
| 4,456,199 | 6/1984 | Seibert | 242/158 R |

*Primary Examiner*—Stephen C. Buczinski
*Assistant Examiner*—Linda J. Wallace
*Attorney, Agent, or Firm*—Freddie M. Bush; James T. Deaton

[57] ABSTRACT

An electromechanical lag angle detector device in which the lag angle of a fiber that is being wound on a bobbin is sensed by an electromechanical lag angle detector which causes an output signal to be produced which is proportional to the variation from the preset lag angle to provide a signal to a computer for causing an adjustment in translation of the bobbin in accordance with the sensed lag angle of the fiber.

3 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ELECTROMECHANICAL LAG ANGLE DETECTOR

DEDICATORY CLAUSE

The invention described herein may be manufactured, used, and licensed by or for the Government for governmental purposes without the payment to us of any royalties thereon.

BACKGROUND OF THE INVENTION

In the past, in attempts to wind fiber such as an optical fiber on a bobbin for dispensing the fiber from the rear of a missile, the angle at which the fiber is wound on the bobbin has been determined and controlled by visual reference. This method obviously is not suitable for automatic altering or maintaining of the lag angle of the fiber as it is being wound on the bobbin. Therefore, there is a need for a mechanism that has the capability of causing the lag angle of a fiber that is being wound on a bobbin to be maintained at a substantially constant lag angle that is preselected.

Accordingly, it is an object of this invention to provide an electromechanical lag angle detector by which one can utilize an electrical output thereof to cause the lag angle of the fiber to remain substantially constant as the fiber is wound on a bobbin.

Another object of this invention is to provide an electromechanical lag angle detector that produces an output that can be readily used by a computer.

Still another object of this invention is to provide an electromechanical device which measures the lag angle of the fiber and produces an output which is indicative of the lag angle of the fiber.

A still further object of this invention is to provide an electromechanical lag angle detector that greatly enhances the ability of a fiber winder to wind multiple layers of fiber on a bobbin.

Other objects and advantages of this invention will be obvious to those skilled in this art.

SUMMARY OF THE INVENTION

In accordance with this invention, an electromechanical lag angle detector is provided for producing an output that is proportional to the change in set lag angle of a fiber as it is being wound on a bobbin for deployment from a fiber optic guided missile as the missile is launched. The electromechanical lag angle detector has an arm through which the optical fiber passes and the arm is pivoted and connected to a potentiometer which has an output which varies in accordance with variation of the lag angle of the fiber that is being wound on the bobbin.

DESCRIPTION OF THE PREFERRED EMBODIMENT

Figure 1:
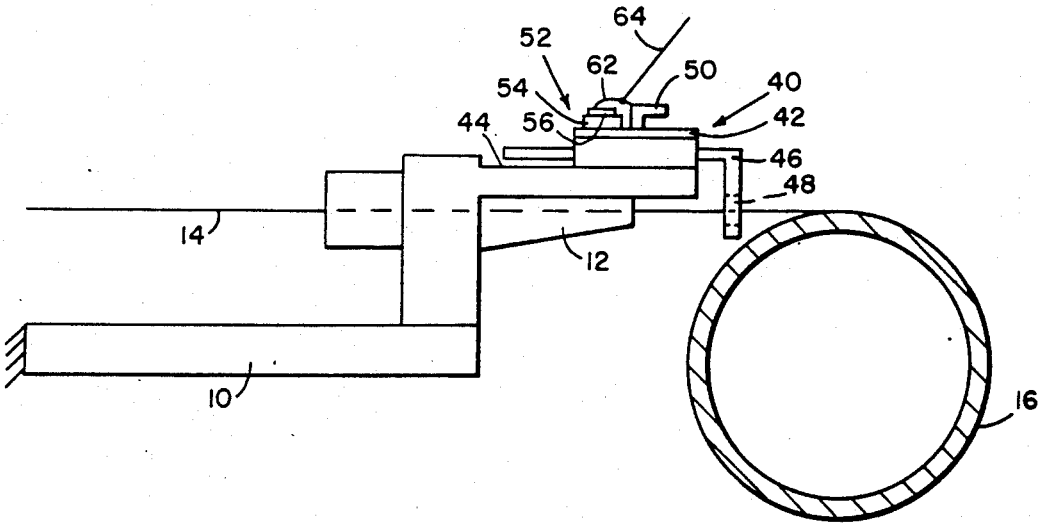
FIG. 1 is a side view partially in section and illustrating winding of an optical fiber on a bobbin.
Figure 2:
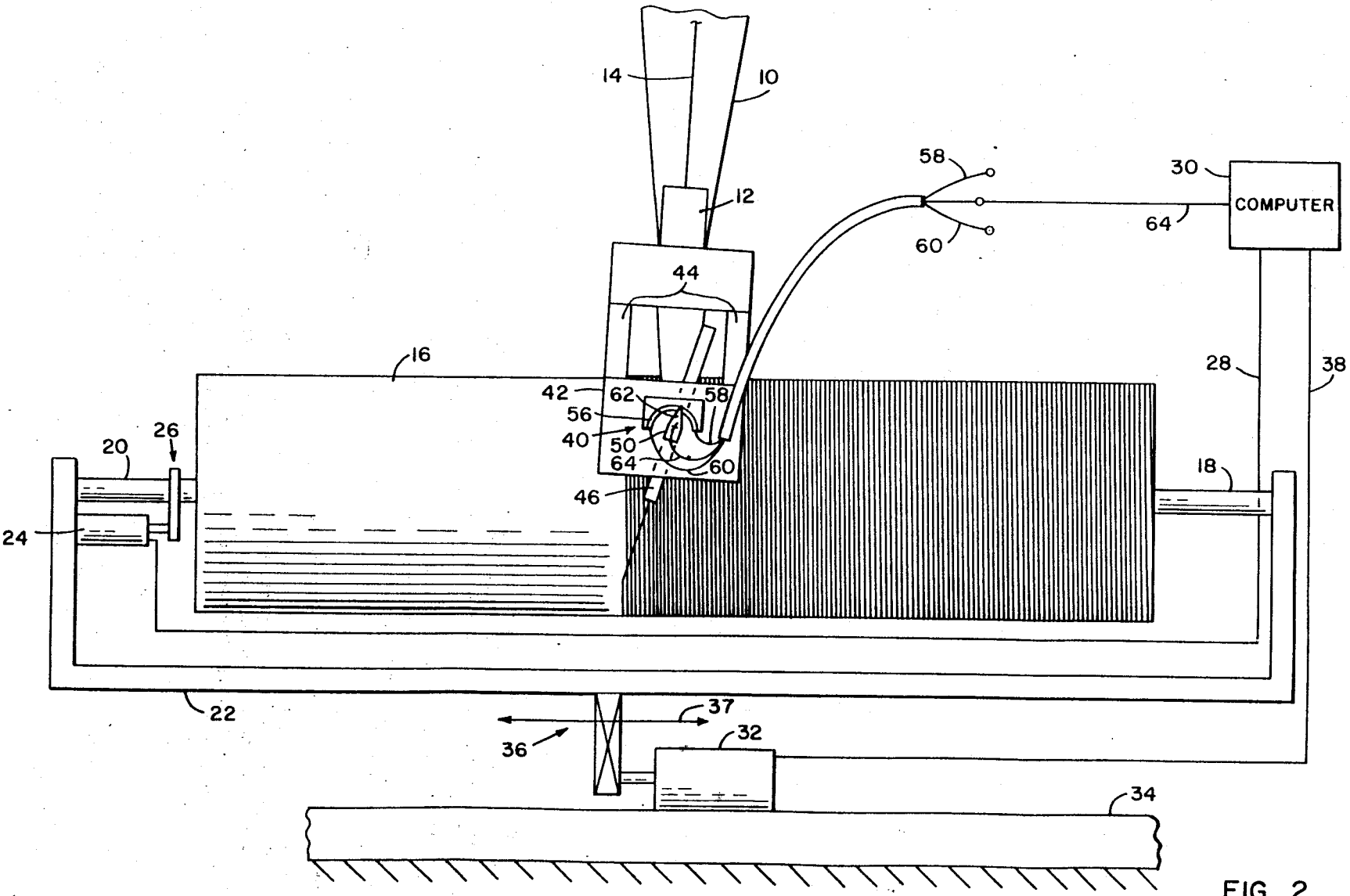
FIG. 2 is a schematic plan view illustrating the system involved in maintaining a predetermined lag angle for a fiber and an electromechanical lag angle detector which produces an output to a computer which adjusts translation of the bobbin and therefore the mechanical lag angle.

This invention is a device for determining and maintaining a predetermined lag angle which is involved in winding an optical fiber for a fiber optic guided missile. The lag angle is defined as the angle between the fiber coming onto a bobbin and the fiber already on the bobbin. A desired lag angle has been determined to be approximately 2°. However, in some applications due to the specific application, a lag angle other than 2° may be desirable. The electromechanical lag angle detector utilized in the device of this invention uses a mechanical feeler arm in order to measure the lag angle by direct contact with the fiber being wound. The feeler arm is connected to a semicircular potentiometer through a wiper contact arrangement that produces a varying voltage in accordance with a varying lag angle. Utilizing the output of this device in a computer to produce an output for varying the translation of a bobbin greatly enhances the ability to wind the fiber without skips or gaps in a layer of fiber or double backs where the fiber pulls back over previously wound fiber.

Referring now to the drawings, the electromechanical lag angle detector device in accordance with this invention includes a fixed head mounting fixture 10 which is fixed in a stationary position and provides a mounting for an eyelet 12 which is mounted in a conventional manner to head 10. Eyelet 12 has a central bore therethrough and a fiber optic 14 that is supplied from a spool (not shown) is threaded through the opening of eyelet 12 for being precisely wound on a bobbin such as bobbin 16. Fiber 14 must be accurately wound on bobbin 16 with substantially no spacing between each fiber turn and with no overlapping of the fiber until the fiber is doubled back when it is caused to be wound in an opposite direction on the bobbin. These requirements are a necessity since fiber 14 is a relatively fragile structure of only a few thousandths of an inch in diameter and must be able to stay intact and not be broken as the fiber is paidout from bobbin 16 when being dispensed from a launched missile. To accomplish the winding of the fiber on bobbin 16, bobbin 16 is rotatably mounted in a conventional manner by shafts 18 and 20 relative to support structure 22. An electric motor 24 is mounted on support structure 22 and connected by a conventional drive mechanism 26 to shaft 20 for rotating bobbin 16 at a constant speed as motor 24 is controlled through cable connection 28 by appropriate control from computer 30. A second electric motor 32 is fixedly mounted to structure 34 and is connected through a conventional connecting means 36 for causing support structure 22 and bobbin 16 mounted thereon to be translated back and forth as illustrated at 37. Electric motor 32 is controlled through cable 38 that is connected to computer 30.

An electromechanical lag angle detector 40 is mounted on head structure 10 by a U-shaped member 42 that is secured in a conventional manner to upper surface 44 of head structure 10. Feeler arm 46 has a slit 48 (see FIG. 1) therethrough with fiber 14 extending through slit 48. Feeler arm 46 has a shaft at the upper surface thereof that extends through conventional mounting means in member 42 and a contact arm 50 is connected to the shaft of feeler arm 46 in a conventional manner to pivotally secure feeler arm 46 relative to support member 42. A potentiometer 52 has a semicircular base structure 54 secured to support member 42 in a conventional manner and opposite ends of semicircular resistor 56 are connected to leads 58 and 60 that are connected to voltage source means as illustrated. A wiper contact 62 is connected to contact arm 50 in a conventional manner and makes contact with semicircular resistor 56. Lead wire 64 is connected to contact 62 at one end and at the other end to computer 30 to provide a signal to computer 30 which is proportional to the particular lag angle of fiber 14 just prior to being wound on the bobbin relative to the fibers already on the bobbin. Signals to computer 30 from lead 64 are utilized by computer 30 to maintain the lag angle of fiber 14 substantially constant to a selected lag angle that has been selected and preprogramed into computer 30.

In operation, with computer 30 preprogramed for control of motors 24 and 32, computer 30 causes motor 24 to drive bobbin 16 at a constant rotation and motor 32 to translate bobbin 16 so as to maintain the lag angle of fiber 14 going onto the bobbin at a substantially constant preset value, for example of about 2°. As the lag angle varies from the preset and desired lag angle, the variation is sensed by potentiometer 40 by arm 46 being pivoted by fiber 14 to produce an output signal in lead 64 that is proportional to the variation in the lag angle. Computer 30 processes this variation to cause motor 32 to maintain, speed-up or slow-down down the translation movement of bobbin 16. The signal produced in lead 64 is caused by arm 46 being moved by the change in lag angle of fiber 14 as it goes on the bobbin. Utilizing this arrangement has been found to be an exceptionally accurate way to maintain the lag angle substantially constant at all times and therefore fiber 14 is very accurately wound on bobbin 16 such that there is no problem in dispensing the fiber from bobbin 16 when a missile is launched and payout of fiber 14 is required. Potentiometer 52 is set relative to the selected lag angle such that the output in lead 64 goes to zero volts when the lag angle of fiber 14 goes to zero. This procedure aids in accurately causing setbacks or reversing of the winding of the fiber as bobbin 16 is moved in an opposite direction to wind multiple layers of fiber 14 on bobbin 16.

Prior to applicants' invention, the lag angle of fiber 14 had to be determined by visual reference and this obviously could not cause automatic adjustment of the lag angle. With applicants' invention, the lag angle is constantly monitored and provides outputs to computer 30 which controls the fiber winding process. The output produced by applicants' electromechanical lag angle detector, when utilized by computer 30, maintains the desired lag angle, and not only the desired lag angle but also provides needed information as an input on setbacks or reversing of the movement of bobbin 16 to cause the fiber to be wound on bobbin 16 in multiple layers in order to provide a sufficient length of fiber 14 on bobbin 16.

We claim:

1. An electromechanical lag angle detector device comprising a fixed head mounting fixture with an eyelet mounted thereon with an opening through the eyelet and a fiber mounted through the opening of the eyelet, a support member mounted on the fixed head and a feeler arm pivotally mounted relative to said support member, said feeler arm having a slot therethrough that is aligned with the opening through said eyelet and a contact arm on said feeler arm with a contact of a potentiometer connected thereto for being rotated as the contact arm is rotated by said feeler arm, said support structure also having variable resistor structure of said potentiometer mounted thereon with said contact being in electrical engagement with said variable resistor structure, a power source connected across opposite ends of said variable resistor and said fiber extending through said slot in said feeler arm so that as the fiber is wound on a bobbin, said feeler arm will be actuated by said fiber and thereby actuate said electrical contact of said contact arm to produce an output which is proportional to the variation in lag angle of the fiber that is being wound on the bobbin.

2. An electromechanical lag angle detector device as set forth in claim 1, wherein said bobbin has a first motor drive arrangement connected thereto for rotating the bobbin at a substantially constant speed, and a second motor and drive structure connected to said bobbin to translate said bobbin back and forth relative to said head mounting fixture.

3. An electromechanical lag angle detector device as set forth in claim 2, wherein said output is connected to a computer for providing signals to the computer, and said computer being connected to said first motor for driving said bobbin for causing said first motor to drive said bobbin at a constant speed, and said computer also being connected to said second motor and drive mechanism which translates said bobbin and said computer controlling said translating drive mechanism such that said bobbin is translated in accordance with the sensed lag angle of the optical fiber being wound on the bobbin.

* * * * *